United States Patent [19]
Zucker et al.

[11] Patent Number: 5,651,214
[45] Date of Patent: Jul. 29, 1997

[54] BIODEGRADABLE SEED POD GERMINATION SYSTEM

[76] Inventors: William V. Zucker, 2920 N. Forgeus Ave., Tucson, Ariz. 85716; F. D. Williams, 4600 E. Blue Mountain Dr., Tucson, Ariz. 85718

[21] Appl. No.: 488,978

[22] Filed: Jun. 8, 1995

[51] Int. Cl.⁶ ............................................. A01G 23/02
[52] U.S. Cl. .................................... 47/74; 47/60
[58] Field of Search .................. 47/74 R, 41.11, 47/60 NL, 60 R, 41.01

[56] References Cited

U.S. PATENT DOCUMENTS

| | | | |
|---|---|---|---|
| 1,192,824 | 7/1916 | Bohlman | 47/74 R |
| 2,728,169 | 12/1955 | Spengler et al. | |
| 2,957,274 | 10/1960 | Colvin | 47/60 NL |
| 3,095,670 | 7/1963 | Raab | 47/60 NL |
| 3,962,822 | 6/1976 | Walters | 47/74 R |
| 4,236,350 | 12/1980 | Hasselbach | 47/17 |
| 4,369,599 | 1/1983 | Franclet et al. | 47/74 |
| 4,813,178 | 3/1989 | Ferrand | |
| 4,881,344 | 11/1989 | Frey et al. | |
| 4,963,230 | 10/1990 | Kawase et al. | 162/129 |
| 5,058,320 | 10/1991 | Tsuru et al. | 47/86 |
| 5,155,935 | 10/1992 | Tanimura et al. | 47/74 R |
| 5,209,014 | 5/1993 | Teichmann | 47/73 |

FOREIGN PATENT DOCUMENTS

| | | | |
|---|---|---|---|
| 7801067 | 8/1978 | Netherlands | 47/60 NL |
| 1039188 | 8/1966 | United Kingdom | 47/60 NL |
| 2157534 | 10/1985 | United Kingdom | 47/74 R |

OTHER PUBLICATIONS

Charlie Nardozzi, "Pots: Peat vs. Plastic" National Gardening, Jan.–Feb. 1994 pp. 50–51.

Mark Freeman, "Starting Seeds Indoors on a Shoestring" Country Journal, Jan.–Feb. 1995, pp. 38–43.

Nancy Bubel, "A Place to Germinate," Horticulture, Feb. 1995, pp. 28ff.

Brookstone Catalog: E–Z Seed Germinator Transplant System 1995.

Gardener's Supply Co. Catalog, Accelerated Propagation System, 1995.

W. Atlee Burpee & Co. Catalog, Seed 'n Start, 1994.

*Primary Examiner*—Terry Lee Melius
*Assistant Examiner*—Joanne C. Downs

[57] ABSTRACT

A systematic device for germinating plant seeds under controlled conditions is disclosed, consisting in its illustrated embodiment of a water-bearing container (1), biodegradable pods (2), clear cover (6) with an air hole (8), pod alignment plate (3), moisture indicator (9), germination mix (4), seed (5), fertilizer amendment (11), carrying handle (10) and watering tube (7). A new use of a paper coin envelope is disclosed as a method for germinating seeds and growing seedlings for direct introduction into an alternative growing medium without the necessity for transplantation.

7 Claims, 3 Drawing Sheets

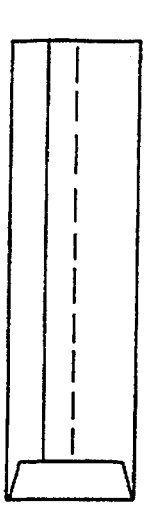 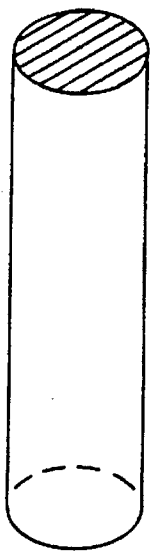  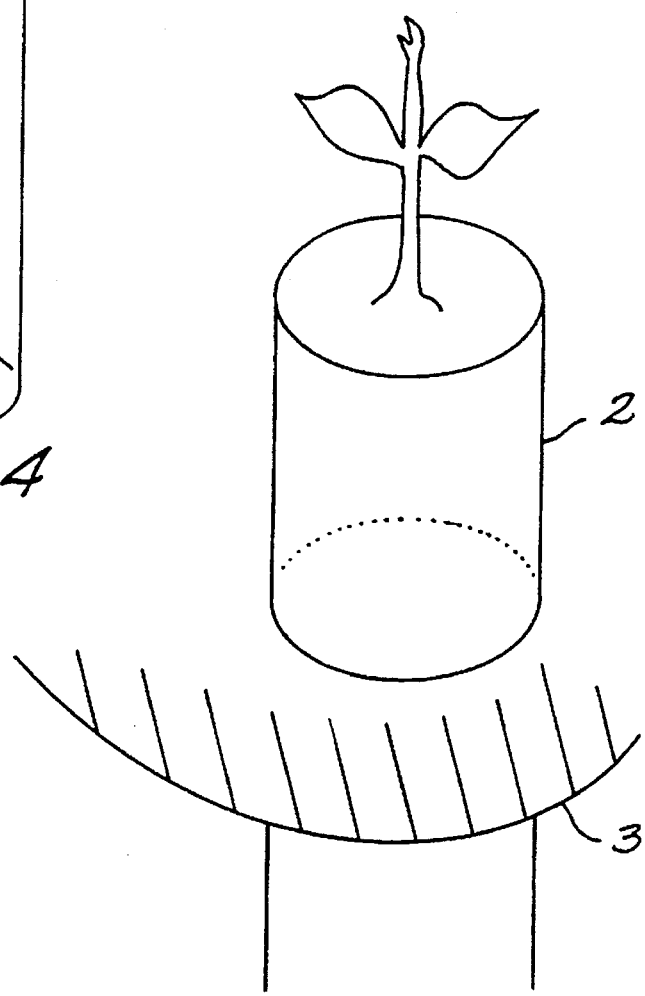
FIG. 3   FIG. 4
FIG. 5

BIODEGRADABLE SEED POD GERMINATION SYSTEM

BACKGROUND

1. Field of Invention

This invention relates to devices for aiding amateur gardeners in germinating plant seeds, producing and growing seedlings for the home garden; specifically to a system which protects germination of seeds and growth of seedlings within biodegradable pods which may be introduced into a natural environment without transplantation.

2. Description of Prior Art

Most of the more than 80 million Americans who garden do not plant seeds directly into the soil. Excessive cold or heat, herbivorous insects and birds, all may prevent successful seed germination and seedling growth. As a result, many gardeners plant seeds in separate containers and then transplant them to the garden when conditions become more hospitable. Others purchase commercially grown seedlings for transplantation. Still, most homegrown vegetables and many flowers are produced from seeds.

Even for experienced gardeners, the germination of seeds in containers and their timely transplantation into the soil is a challenging task. Sixty percent of those Americans who garden do so only on a very limited basis. Inexperience, lack of time, and the difficulties of growing and transplanting seedlings leads to frequent failures, waste, frustration, and unnecessary expense.

The method currently used by most gardeners requires carefully selecting and properly assembling the necessary elements. These elements must then be monitored closely to minimize losses during germination and early development of seedlings. Additional losses at the time of transplantation into a natural environment are common.

The usual process for producing plants from seeds is to begin by obtaining potting soil. To this, the gardener may add milled sphagnum moss, perlite, sand and/or vermiculite. Proper proportions of these ingredients are placed in containers with drain holes. Large numbers of seeds are purchased in packages, with one or more seeds planted in each container at a specified depth. The gardener then estimates the proper amount of water to add to establish proper soil moisture content for germination.

A hundred plants or more may be required for a modest garden. Once seeds are planted, the gardener must rely on personal experience and knowledge to determine when to add water and to estimate how much water should be added to maintain the desired level of soil moisture. The gardener must monitor and control lighting and temperature, often by moving individual containers to achieve optimum conditions. When seedlings form true leaves, the gardener transplants them into larger containers or into the garden.

Transplantation is traumatic to plants. Any sudden change in environment can cause a slowing or stunting of growth from which the plant may never recover. For some varieties of plants, 80 or 90 percent of seeds cannot be will fail to survive germination and transplantation by an average gardener.

As a result, some amateur gardeners purchase bedding plants grown in nurseries or greenhouses for transplantation. In such cases, it may be necessary to engage in a regime of hardening off to acclimate plants gradually to the harsher conditions found in the garden. To minimize losses the gardener must monitor temperature, wind, lighting conditions and other factors and promptly move the plants once or more each day for up to a week or more prior to transplantation. Commercially grown seedlings, or bedding plants, also may become rootbound in their containers, increasing the likelihood of plant loss.

Gardeners have long sought a way to avoid transplant shock through the use of a biodegradable containers. U.S. Pat. No. 2,728,169 to Spengler (1955) discloses an improved plant pot made of peat moss fibers reinforced with cellulose, designed to be sturdy enough to withstand commercial handling and yet able to permit unhampered growth of plant roots therethrough. This was intended to permit gardeners to place the plant directly into the soil without removing the peat pot, thus reducing transplantation shock.

Peat pots have numerous disadvantages. As Nancy Bubel writes in "A Place to Germinate" (*Horticulture*, February 1995, p. 30), "Pots made of pressed peat are advertised as biodegradable, which they are. But my experience is that roots can have trouble penetrating the fiber, especially if the rim is allowed to project above the soil when the pot is put into the garden. Peat pots last only one season and thus their relatively high cost cannot be amortized over a few years. And if you don't store unused pots carefully from one season to the next, they become misshapen and hard to separate. I haven't used them for years."

Eight gardeners used peat pots and plastic pots for germination in tests for *National Gardening* (January–February, 1994, pp. 50–51). They found "dramatic variations in both growth and yield" between peat pots and plastic containers. Under water-deficit conditions, peat pots compete with the seedling for water and thus deprive the plant of necessary nutrients and moisture. "The poor performance of the peat-pot group could be due to peat pots' tendency to dry out quickly," according to Robert Dufault, vegetable transplant specialist at Clemson University's Coastal Research and Education Center in Charleston, S.C.

Numerous efforts have been made to find practical biodegradable alternatives to the peat pot. Cigarette papers used for commercial sleeves have too little wet strength. Teabag papers and coffee filters decompose too quickly. It is conventional wisdom among those familiar with the art of home gardening that paper products are unsatisfactory for this purpose. It is widely believed that ordinary paper will fall apart too soon and thus not be suitable for germination and growth, while more expensive cardstocks or cardboard will inhibit root growth.

Numerous non-biodegradable containers for seed germination are in common use. Plastic, pressed fiber, and wood are used as containers for germination. The major disadvantage of all such containers is that they require transplantation of the seedlings, resulting in transplant shock. While some offer clear plastic covers to reduce water loss, none offers a complete ready-to-grow system designed to be used by novice gardeners. Amateur gardeners will, as a result, suffer plant losses from improper selection of materials and/or management of the growing regime.

Soil blocks, made by molding wet soil using a special tool, can be introduced directly into the garden without transplantation. They have several disadvantages, however. Special soil mixtures, which may not provide optimum germination and growth, must be used to mold the blocks. Directly watering soil blocks is likely to cause them to disintegrate, so they must be placed on a special watering mat. The large exposed surface area causes them to dry out quickly, affecting the seedlings access to water. Roots are pruned by exposure to air, restricting development of the root system. Because soil blocks lack external support, they may collapse if tilted or jarred when moved. Considerable care is required to avoid complete loss of the plant due to crumbling of the soil block. The blocks are thus not well suited to use by amateur gardeners and are not an integral part of a workable system for managing germination and growth of seedlings prior to their introduction into the home garden.

U.S. Pat. No. 4,881,344 to Frey (1989) describes a tubular sleeve for plant germination substrate consisting of a polymer mass and nonwoven, bonded fiber material treated with fungicides, in which cellulose fibers predominate. The described invention is intended to overcome difficulties in high-speed methods of plant germination for commercial operations. The disadvantage of such a biodegradable sleeve is that it requires very large specialized production runs of a custom material. This material is not currently available in the U.S.

OBJECTS AND ADVANTAGES

Several objects and advantages of the present invention are:

(a) to provide a biodegradable seed germination pod which will remain intact during the period prior to relocation to the garden;

(b) to provide a biodegradable seed germination pod which will not compete with the growing plant for water or nutrients;

(c) to provide a biodegradable seed germination pod which will disintegrate quickly and completely shortly after setting out in a garden or other environment;

(d) to provide a biodegradable seed germination pod which may be produced at very low cost;

(e) to provide a biodegradable seed germination pod which is composed of readily available materials;

(f) to provide a biodegradable seed germination pod which can be easily penetrated by the roots of a young seedling;

(g) to provide a biodegradable seed germination pod which can be prepackaged with germination mix formulated for a specific geographical region;

(h) to provide a biodegradable seed germination pod which can be prepackaged with germination mix formulated for a specific geographical region and selected plant variety, and pre-seeded prior to delivery to gardener;

(i) to provide a biodegradable, seed germination pod which can be prepackaged with germination mix and fertilizer amendment selected for a specific geographical region and a specific plant variety, and pre-seeded prior to delivery to the gardener;

(j) to provide a complete seed-germination system which obviates the need for transplantation;

(k) to provide a complete seed-germination system which makes possible successful seedling development in the absence of gardening knowledge, skill, and experience;

(l) to provide a complete seed germination system which maximizes the number of successful plants produced from a given number of seeds;

(m) to provide a complete seed germination system for which the initial quantity of water to be added can be calculated in advance and provided to the gardener;

(n) to provide a complete seed germination system which includes a means to control humidity and to minimize water loss;

(o) to provide a complete seed germination system which includes a monitoring device to advise gardener when water must be added;

(p) to reducing the cost of growing single plants from seeds by assembling pre-seeded pods prior to delivery to the gardener; and (q) to facilitate wider use of seeds from heirloom and other scarce or endangered varieties of plants by providing a system which enhances successful transfer of seeds to distant gardens, Further objects and advantages are to provide an easy and reliable way for amateur gardeners to germinate seeds, develop healthy seedlings and transfer said seedlings to the natural environment without transplantation; to make the handling and movement of seeds and seedlings easier and less prone to accident; to encourage a restoration of biological diversity through facilitating participation by gardeners in seed and plant preservation programs; to encourage children to observe germination and early growth and to begin gardens from seed; to encourage non-gardeners to begin growing plants by minimizing the difficulties and risks; to encourage gardening in urban areas where space may be limited; and to encourage more healthful eating by making vegetable and fruit gardening easier and less expensive. Still further objects and advantages will become apparent from a consideration of the ensuing description and drawings.

DRAWING FIGURES

FIG. 3 shows the back surface of a coin envelope with a glued seam.

FIG. 4 shows an isometric view of a pod filled with germination mix, seed, and fertilizer amendment.

FIG. 5 shows an expanded isometric view of a germinated seedling in a pod, held by alignment plate under clear cover.

Figure 1:
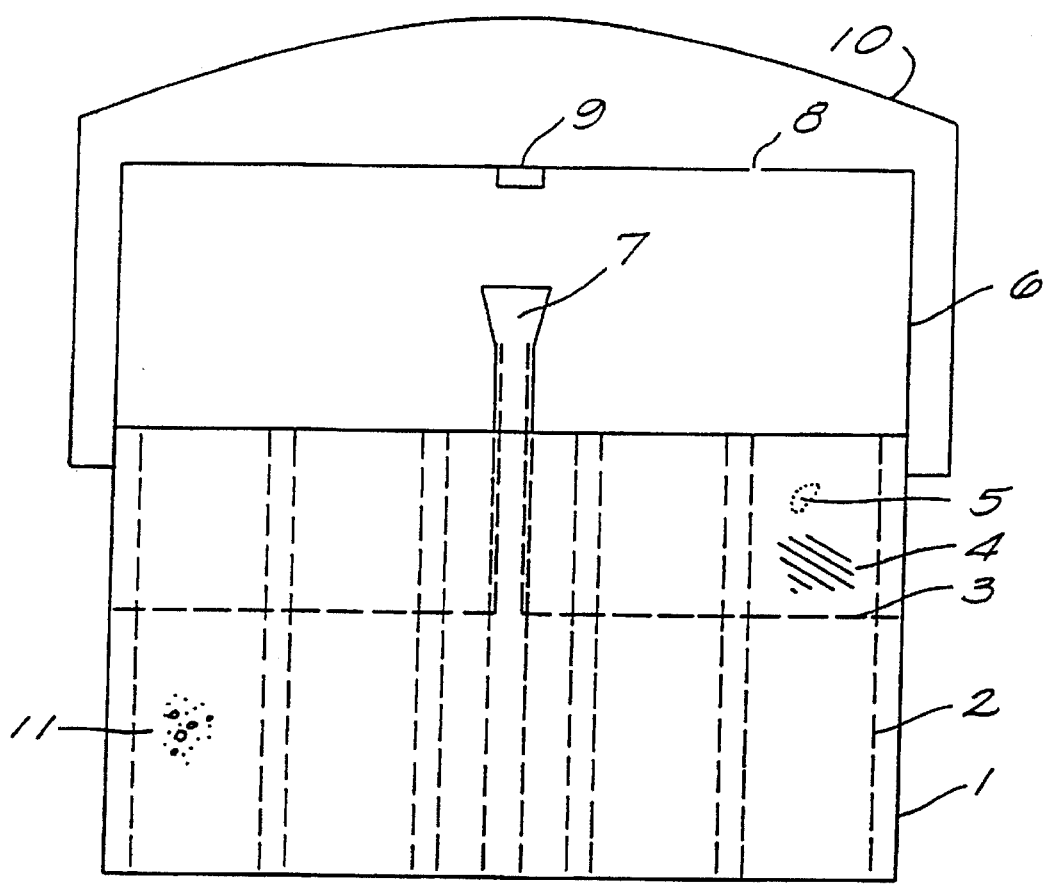
FIG. 1 shows a frontal view of the complete germination system, including the container, pods, pod alignment plate, germination mix, seed, clear cover, watering tube and alignment plate removal rod, air hole, moisture indicator, handle, and fertilizer amendment.

| Reference Numerals in Drawings | |
|---|---|
| 1 container | 2 pod |
| 3 pod alignment plate | 4 germination mix |
| 5 seed | 6 clear cover |
| 7 watering tube | 8 air hole |
| 9 moisture indicator | 10 handle |
| 11 fertilizer amendment | |

DESCRIPTION

FIGS. 1 to 6

Figure 2:
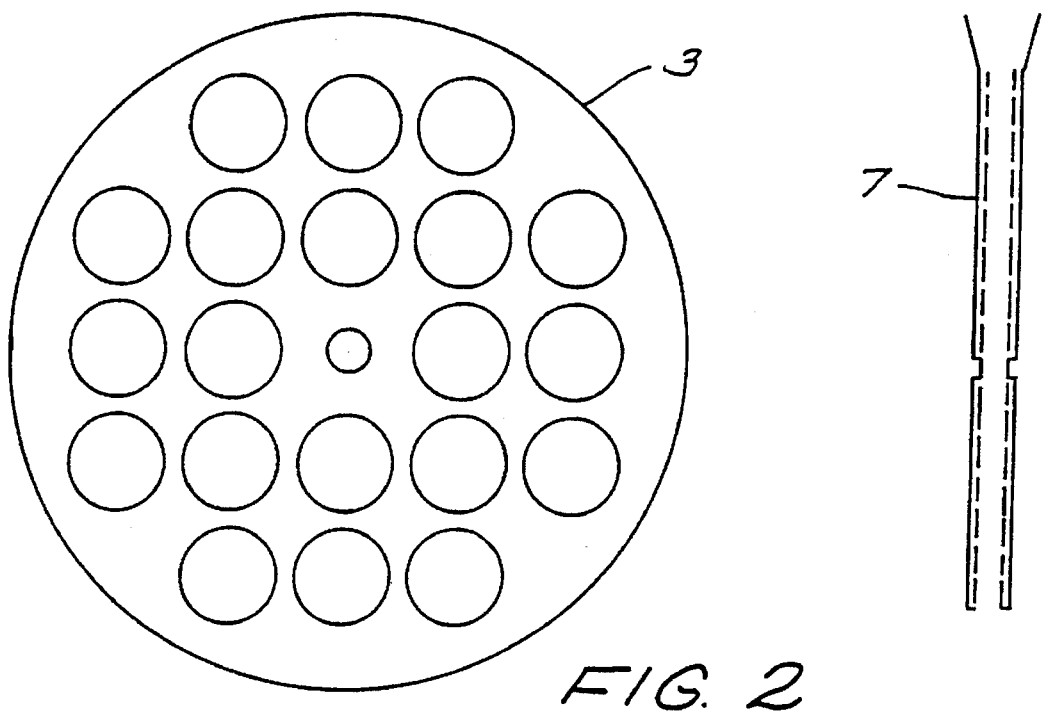
FIG. 2 shows a top view of the pod alignment plate with screw opening in center for watering tube.
Figure 6:
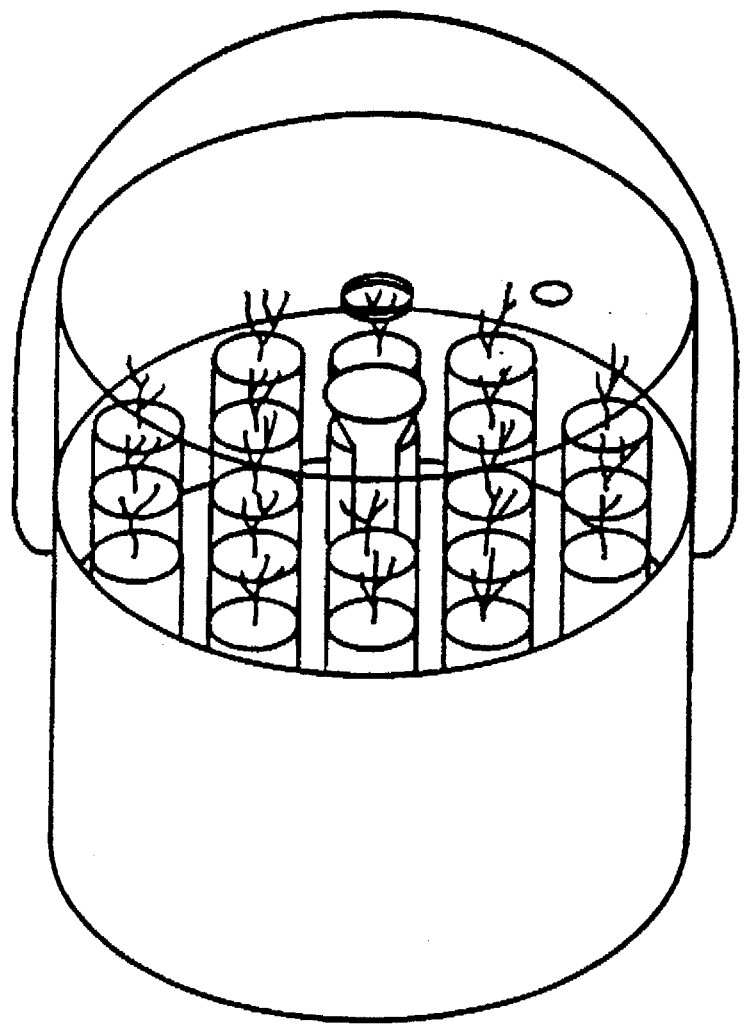
FIG. 6 shows an isometric view of the complete germination system, the container, handle, individual pods, alignment plate, transparent cover, air holes, moisture indicator, and watering tube.

A typical embodiment of the seed germination system with individual biodegradable pods is illustrated in FIG. 1 (frontal view), FIG. 2 (top view), and FIG. 5 (isometric view). A water-bearing container 1 holds a predetermined number of pods 2 in an upright orientation. The open top of the container is enclosed with a clear cover 6. In the exampled embodiment, container 1 is a wide, shallow plastic bucket with handle 10. Pods 2 are coin envelopes filled with a germination mix 4, seed 5, and fertilizer amendment 11. The cover 6 is a clear, molded plastic.

A plastic alignment plate 3 is inserted in a horizontal orientation approximately three inches from the bottom of the container. Individual pods 2 are inserted into openings in the alignment plate 3. A moisture indicator 9 is affixed to the center of cover 6. One air hole 8 approximately 1 mm. in diameter penetrates the cover.

OPERATION

FIGS. 1, 4, 5, 6

The manner of using the biodegradable seed pod germination system in the illustrated embodiment is as follows. The gardener purchases the system (FIG. 1 and 6), including pods 2 filled (FIG. 1 and FIG. 4) with germination mix and fertilizer amendment, and pre-planted with seeds. The gardener removes cover 6 and pours a pre-determined quantity of water through watering tube 7. Cover 6 is then replaced and the system is located where adequate natural or artificial light may pass through cover 6, and where temperatures remain within a pre-determined range.

When the moisture indicator shows a need for additional water, cover 6 is removed, a pre-determined amount of water is added through watering tube 7, and cover 6 is replaced. When seedlings emerge from the tubes (FIG. 5) and are observed to have two or more true leaves, and when pre-determined environmental conditions permit, the gardener prepares a trench or hole in the garden. Gardener then removes cover 6, grasps watering tube 7, and lifts assembly consisting of watering tube 7, alignment plate 3, and pods 2 out of container 1. Filled pods 2 with seedlings (FIG. 6) are allowed to dry slightly to facilitate easy removal from alignment plate 3. Following removal, individual pods 2 are placed upright at pre-determined intervals in the garden trench or in holes, covered with soil, and watered.

SUMMARY, RAMIFICATIONS AND SCOPE

Accordingly the reader will see that the biodegradable seed pod germination system offers inexperienced, would-be, and amateur gardeners a simple method for growing a large variety of different plants from seed by controlling the conditions during germination and early growth, and then by permitting transfer of the seedling to the garden without the necessity of transplantation from its biodegradable pod. Furthermore, it has the additional advantages that

- it permits complete ready-to-grow pods to be assembled in large and efficient production facilities, in small and specialized local facilities, or at home by the gardener;
- it allows a variety of compatible ready-to-grow pods to be included in a single container, reducing the cost per plant when compared to buying a variety of seed packets or bedding plants;
- it is so easy to use and understand that it facilitates use in nursery schools and kindergartens as well as by novice gardeners;
- it permits efficient packaging of heirloom and other rare seeds for distribution and use;
- it provides a one-step system that is easier to ship, store, purchase, and maintain; and
- it provides a reusable and refillable system to which new biodegradable seed pods may be added each season.

While the present invention has been illustrated with the aid of specific embodiments thereof, it will be readily apparent to others skilled in the art that the invention is not limited to these particular embodiments, and that various changes and modifications may be made without departing from the spirit of the invention or the scope of the appended claims. For example, changes in the length and diameter of the pods, changes in the thickness and composition of the paper, changes in the shape and dimensions of the container, removal or relocation of the alignment plate, etc.

Thus the scope of the invention should be determined by the appended claims and their legal equivalents, rather than by the examples given.

We claim:

1. A seed germination system comprising:
   (a) a predetermined number of individual biodegradable seed pods, each of said individual biodegradable seed pods structured to form a sleeve containing a quantity of germination mix with at least one seed therein and having an upper and a lower end; and,
   (b) an enclosed container having,
      1) a base member containing water,
      2) a support member adapted to individually and slidably encircle each of said individual biodegradable seed pods wherein the lower end of each of said individual biodegradable seed pods rests on said base member and contacts water therein, and
      3) window means positioned to admit external light onto the upper end of each of said individual biodegradable seed pods.

2. The seed germination system according to claim 1 wherein each of said individual biodegradable seed pods are adapted to be water permeable.

3. The seed germination system according to claim 2 further including means for monitoring moisture content of air within said enclosed container.

4. The seed germination system according to claim 1 wherein said germination mix includes fertilizer.

5. The seed germination system according to claim 1 wherein said support member is adapted to maintain said individual biodegradable seed pods in a substantially vertical orientation.

6. The seed germination system according to claim 1 wherein said enclosed container includes means for introducing water to said base member.

7. The seed germination system according to claim 6 wherein said enclosed container includes a handle.

* * * * *